(12) United States Patent
Erasala et al.

(10) Patent No.: US 9,068,534 B2
(45) Date of Patent: Jun. 30, 2015

(54) COMPRESSED NATURAL GAS PRESSURE REGULATOR PROTECTIVE BRACKET

(71) Applicant: FORD GLOBAL TECHNOLOGIES, LLC, Dearborn, MI (US)

(72) Inventors: Shekar Prabhakar Erasala, Northville, MI (US); Mario Alberto Mendez, Mexico City (MX); Michael Shawn Watterworth, Riverview, MI (US); Jose Luis Luis Trejo Chavez, Mexico City (MX); Ulises T Herrera Esquibel, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 13/835,989

(22) Filed: Mar. 15, 2013

(65) Prior Publication Data

US 2014/0261728 A1  Sep. 18, 2014

(51) Int. Cl.
- *F02M 21/02* (2006.01)
- *F02B 43/00* (2006.01)
- *F02D 19/08* (2006.01)
- *F02M 13/08* (2006.01)
- *F02D 19/06* (2006.01)

(52) U.S. Cl.
CPC ....... *F02M 21/0239* (2013.01); *F02M 21/0215* (2013.01); *F02B 43/00* (2013.01); *F02D 19/08* (2013.01); *F02M 13/08* (2013.01); *F02M 21/02* (2013.01); *F02D 19/06* (2013.01); *Y02T 10/32* (2013.01)

(58) Field of Classification Search
CPC ........ F02M 13/08; F02M 21/02; F02B 43/00; F02D 19/06; F02D 19/08
USPC .......................................................... 123/525
See application file for complete search history.

(56) References Cited

U.S. PATENT DOCUMENTS

| | | | |
|---|---|---|---|
| 5,330,031 A | 7/1994 | Hill et al. | |
| 5,450,832 A * | 9/1995 | Graf | 123/515 |
| 2003/0183317 A1 * | 10/2003 | Czaplicki et al. | 156/79 |
| 2009/0007527 A1 * | 1/2009 | Mitsudou | 55/290 |
| 2009/0167300 A1 * | 7/2009 | Cech et al. | 324/239 |

* cited by examiner

*Primary Examiner* — Lindsay Low
*Assistant Examiner* — Charles Brauch
(74) *Attorney, Agent, or Firm* — Greg P. Brown; Price Heneveld LLP

(57) ABSTRACT

A protective bracket for a compressed natural gas pressure regulator mounted in an engine compartment of a motor vehicle is disclosed. The compressed natural gas pressure regulator is disposed between a natural gas pressurized tank and an intake system for an internal combustion engine within the engine compartment, and the protective bracket comprises a main body disposed essentially about the entire external volume of the compressed natural gas pressure regulator.

16 Claims, 10 Drawing Sheets

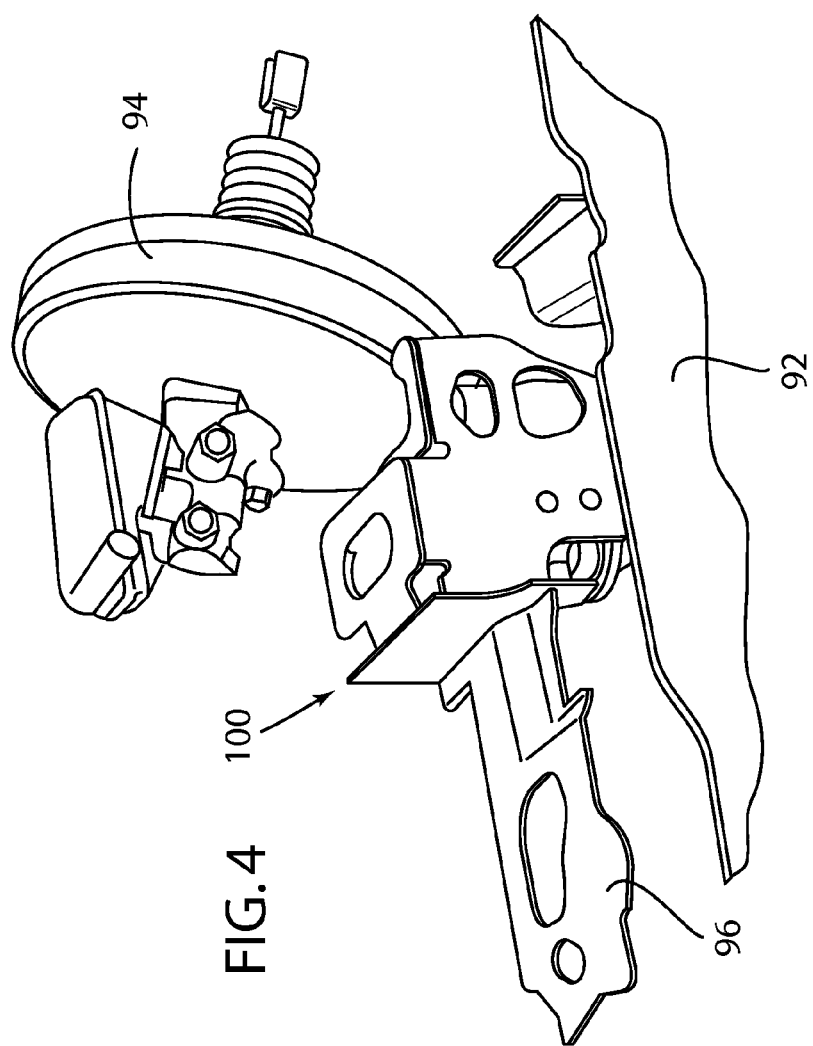

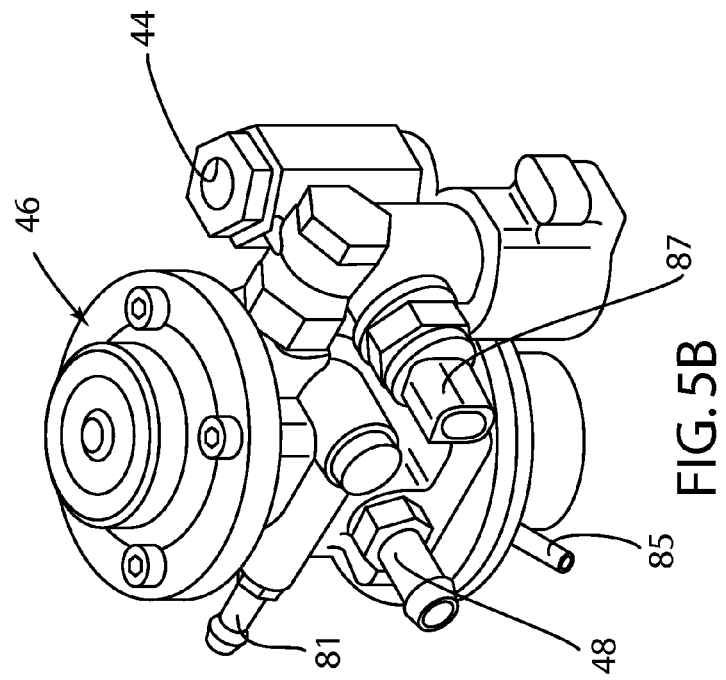
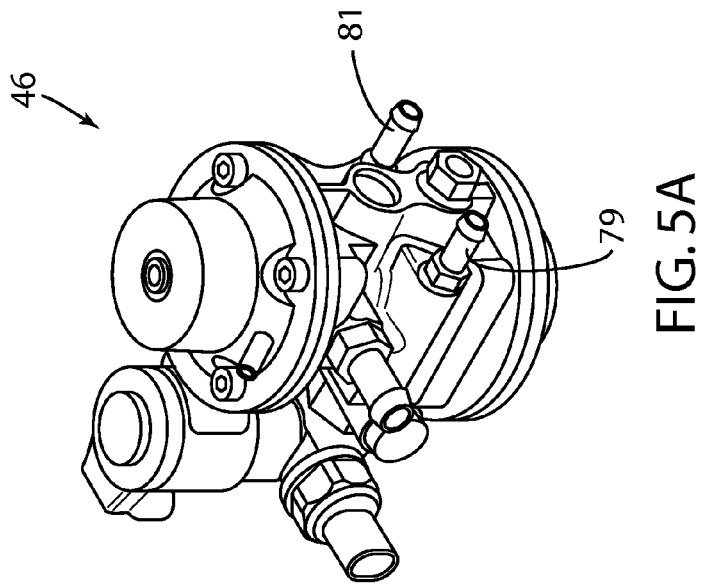
FIG. 5B
FIG. 5A

COMPRESSED NATURAL GAS PRESSURE REGULATOR PROTECTIVE BRACKET

FIELD OF THE INVENTION

The present invention generally relates to a gas pressure regulator for a motor vehicle equipped to operate on compressed natural gas, specifically a protective bracket encasing the gas pressure regulator within an engine compartment to protect the gas pressure regulator.

BACKGROUND OF THE INVENTION

Compressed natural gas (CNG) fuel delivery systems for use in motor vehicles powered by internal combustion engines are generally well-known in the art. More recently, such systems have been combined with gasoline fuel delivery systems to provide so-called dual fuel systems. Such dual fuel motor vehicles are equipped with a multi-fuel engine capable of running on either of CNG and gasoline fuel. In most such systems, the engine is primarily or alternatively fueled by a quantity of CNG stored onboard the vehicle in one or more pressured storage tanks or fuel cylinders. Since the CNG is stored at pressures of about 3000 psi, it is necessary to employ a gas pressure regulator to reduce the pressure of the CNG in the storage tanks from 3000 psi to 30 psi in two stages, from 3000 psi to 80 psi, and then from 80 psi to 30 psi, for delivery to the engine. After this pressure reduction, the CNG is approximately at the same pressure as that provided by gasoline fuel pumps before the fuel is injected into the engine cylinder via the manifold injection system. Thus, the same engine can beneficially use either fuel source, depending on availability.

In most CNG systems, fuel refueling fittings are provided, such as in the engine compartment, by which the pressured storage tanks may be refilled at a refueling station. The pressured storage tanks are in fluid communication with the engine via the gas pressure regulator and an injector assembly, the injector assembly forming a portion of the fuel intake system of the engine. Thus, inlet and outlet CNG lines to and from the gas pressure regulator are required. Since gases cool as they expand, supply and return coolant lines may also be provided to the gas pressure regulator to supply heat to the CNG flowing therethrough and thereby improve combustion by increasing the enthalpy of the fuel delivered to the engine. Accordingly, gas pressure regulators for CNG systems used in motor vehicles are required to have several fittings thereto, many of which create a potential source of leakage of a combustible gas if damaged.

To this end, various regulations and standards have been developed to address the integrity of CNG systems in the event of a collision. One such standard is Federal Motor Vehicle Safety Standard (FMVSS) 303, established by the United States Department of Transportation, National Highway Traffic Safety Admission, which specifies performance requirements for the integrity of motor vehicle fuel systems using CNG. Under FMVSS 303, the CNG system must be able to withstand a 30 mph frontal impact, such that the pressure drop in the high pressure portion of the fuel system, including the storage tanks and gas pressure regulator, does not exceed 154 psi over a 60 minute period following cessation of vehicle motion.

An additional concern of dual fuel motor vehicles lies in packaging the alternative fuel components without changing the gasoline fuel delivery system, which is often a preexisting system. A dual fuel motor vehicle modified to operate with CNG as well as gasoline fuel thus requires a modified engine provided with injectors and combustion cylinders adapted for CNG use, as well as high and low pressure CNG lines, filler nozzle and lines, the pressure regulator, high-pressure storage tanks and an alternative fuel control module as the main components. As a result, scores of additional components and parts are added to such dual fuel vehicles, making the packaging of the new components a challenge.

As noted above, the gas pressure regulator is required to reduce the pressure of the CNG gas in the storage tanks from 3000 psi to 30 psi. Such gas pressure regulators can have an approximate volume of over 2400 cubic centimeters. Thus, due to their relatively large size and complexity, such gas pressure regulators create special packaging concerns in view of the always-present need to balance ease of assembly, serviceability, and protection that arise in every location selection opportunity. Hence, a mounting assembly for a gas pressure regulator that addresses these concerns would be advantageous.

The CNG pressure regulator protective bracket disclosed herein particularly accomplishes the foregoing by providing structure about the gas pressure regulator that encases essentially the entire gas pressure regulator, while simultaneously providing access to the various fittings allowing fluid communication to and from the gas pressure regulator. The present protective bracket itself utilizes a light-weight structure so as not to degrade vehicle efficiency and fuel economy. It also takes advantage of existing structural configurations in order to provide additional protection, and is preferably combined with the vehicle battery tray mounted in front of the gas pressure regulator. The battery and battery tray add structural support and integrity to the protective bracket.

Thus, the solution presented by the present gas pressuring regulator protective bracket is a relatively low-cost, light-weight structure that protects the gas pressure regulator and its associated fittings.

SUMMARY OF THE INVENTION

According to one aspect of the present disclosure, a protective bracket for a CNG pressure regulator of a CNG fuel delivery system in fluid communication with an internal combustion engine mounted in an engine compartment of a motor vehicle is disclosed. The CNG fuel delivery system comprises at least one CNG pressurized tank for storing CNG aboard the motor vehicle and fuel delivery lines extending from the pressured tank to an intake system for the internal combustion engine, wherein the CNG pressure regulator is disposed between the CNG pressurized tank and the intake system for the internal combustion engine within the engine compartment, and wherein the protective bracket comprises a main body disposed essentially about the entire external volume of the CNG pressure regulator.

Still another aspect of the present disclosure is a protective bracket for a motor vehicle having a crash event sensor, a controller responsive to the crash event sensor, and fuel delivery lines extending from the CNG pressured tank to an intake system for the internal combustion engine, and an electronically actuated normally closed valve being disposed between the CNG pressurized tank and the CNG pressure regulator, wherein the controller signals the electronically actuated, normally closed valve to terminate the flow of compressed natural gas in the response to a crash event detected by the crash sensor.

Yet another aspect of the present disclosure is a protective bracket for a CNG regulator having a high pressure CNG inlet from which high pressure CNG is delivered to the CNG regulator through a high pressure delivery line and a low pressure CNG outlet from which low pressure CNG is delivered to the internal combustion engine from the CNG pressure regulator through a low pressure delivery line and the main body is provided with an opening aligned with the low pressure CNG outlet through which the low pressure delivery line passes.

An additional aspect of the present disclosure is a protective bracket for a CNG pressure regulator where the high pressure CNG inlet and the low pressure CNG outlet are disposed within the main body of the protective bracket.

Another aspect of the present disclosure is a protective bracket where the main body of the protective bracket further comprises a first set of stiffener ribs oriented parallel to a longitudinal axis of the motor vehicle and a second set of stiffener ribs oriented perpendicular to the longitudinal axis of the motor vehicle to resist deformation of the main body and reduce compression forces exerted on the CNG pressure regulator.

Still another aspect of the present disclosure is a protective bracket having a front bracket and a top reinforcing bracket mounted to the main body to resist deformation of the main body and reduce compression forces exerted on the CNG pressure regulator.

A further aspect of the present disclosure is a protective bracket where a battery tray is disposed within the engine compartment in front of the CNG pressure regulator and the protective bracket further comprises a tray coupling bracket mounted to the front bracket and to the battery tray.

Yet a further aspect of the present disclosure is a protective bracket having a main body comprising a first pair of side walls oriented parallel to a longitudinal axis of the motor vehicle and second pair of side walls oriented perpendicular to the longitudinal axis of the motor vehicle, the first pair of side walls having a first set of stiffener ribs oriented parallel to the longitudinal axis of the motor vehicle and the second pair of side walls having a second set of stiffener ribs oriented perpendicular to the longitudinal axis of the motor vehicle to resist deformation of the main body and reduce compression forces exerted on the CNG pressure regulator.

An additional aspect of the present disclosure is a protective bracket of further comprising a first pair of side walls oriented parallel to a longitudinal axis of the motor vehicle, a front bracket and a top reinforcing bracket, the front and top reinforcing bracket extending between and mounted to each of the first pair of side walls.

Yet another aspect of the present disclosure is a protective bracket having a top reinforcing bracket further comprising a front top reinforcing bracket and rear top reinforcing bracket extending between and mounted to each of the first pair of side walls.

A still further aspect of the present disclosure is a protective bracket further comprising a clamp member attached to a side rail provided within the engine compartment.

Another aspect of the present disclosure is a protective bracket for a CNG pressure regulator mounted in an engine compartment of a motor vehicle, where the CNG pressure regulator is disposed between a CNG pressurized tank and an intake system for an internal combustion engine within the engine compartment, and where the protective bracket comprises a main body disposed essentially about the entire external volume of the CNG pressure regulator.

A yet additional aspect of the present disclosure is a protective bracket for a CNG pressure regulator having a high pressure CNG inlet from which high pressure CNG is delivered to the CNG pressure regulator through a high pressure delivery line and a low pressure CNG outlet from which low pressure CNG is delivered to the internal combustion engine from the CNG pressure regulator through a low pressure delivery line and the main body is provided with an opening aligned with the low pressure CNG outlet through which the low pressure delivery line passes, and where the high pressure CNG inlet and the low pressure CNG outlet are disposed within the main body of the protective bracket.

A further aspect of the present disclosure is a protective bracket for a motor vehicle that has a controller and the CNG pressure regulator comprises a connector for receiving a wiring harness connected with the controller, the protective bracket having an opening aligned with the connector through which the wiring harness passes, and wherein the connector is disposed entirely within the main body of the protective bracket.

Still another aspect of the present disclosure is a protective bracket having a top reinforcing bracket comprising a front top reinforcing bracket and rear top reinforcing bracket extending between and mounted to each of the first pair of side walls and the main body comprises a recess within which a brake booster body is received.

Yet another aspect of the present disclosure is a protective bracket fabricated from stamped high strength low alloy steel having a thickness of approximately 3 mm.

According to another aspect of the present disclosure, a protective bracket is provided for a motor vehicle adapted to operate on either of gasoline or compressed natural gas and the motor vehicle further comprises a gasoline fuel pump, a crash event sensor, a controller responsive to the crash event sensor, a CNG pressurized tank for storing CNG aboard the motor vehicle and fuel delivery lines extending from the CNG pressured tank to an intake system for the internal combustion engine, the CNG pressure regulator being disposed between the CNG pressurized tank and the intake system for the internal combustion engine within the engine compartment, and an electronically actuated valve being disposed between the CNG pressurized tank and the CNG pressure regulator, and wherein the controller signals the fuel pump and the electronically actuated valve to terminate the flow of gasoline and CNG in the response to a crash event detected by the crash sensor.

According to a further aspect of the present disclosure, a method of protecting a CNG pressure regulator of a CNG fuel delivery system in fluid communication with an internal combustion engine mounted in an engine compartment of a motor vehicle is disclosed, the CNG fuel delivery system comprising at least one CNG pressurized tank for storing CNG aboard the motor vehicle and fuel delivery lines extending from the CNG pressured tank to an intake system for the internal combustion engine, wherein the CNG pressure regulator is disposed between the CNG pressurized tank and the intake system for the internal combustion engine within the engine compartment, wherein the method comprises the steps of providing the CNG pressure regulator with a compressed CNG inlet from which high pressure CNG is delivered to the CNG pressure regulator through a high pressure delivery line and a low pressure CNG outlet from which low pressure CNG is delivered to the internal combustion engine from the CNG pressure regulator through a low pressure delivery line, providing a protective bracket having a main body provided with an opening aligned with the CNG inlet when the CNG pressure regulator is disposed within the protective bracket, inserting the CNG pressure regulator into the main body such that the entire external volume of the CNG pressure regulator is disposed within the main body, mounting the protective bracket to a side rail within the engine compartment, and connecting the CNG pressure regulator inlet to the high pressure delivery line and connecting the regulator outlet to the low pressure delivery line.

Yet another aspect of the present disclosure is a method where the motor vehicle further comprises a crash event sensor, a controller responsive to the crash event sensor and fuel delivery lines extending from the CNG pressured tank to an intake system for the internal combustion engine, and an electronically actuated valve being disposed between the CNG pressurized tank and the CNG pressure regulator, and wherein the controller signals the electronically actuated valve to terminate the flow of CNG in response to a crash event detected by the crash sensor, the gas pressure regulator further comprises a connector for receiving a wiring harness connected with the controller and an opening in the main body aligned with the connector through which the wiring harness passes, and wherein the connector is disposed entirely within the main body of the protective bracket, the method further comprising the step of connecting the wiring harness to the connector after the step of mounting the protective bracket to the side rail within the engine compartment.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a front top perspective view of the protective bracket for a CNG pressure regulator of a CNG fuel delivery system of the present disclosure;

FIG. 5A is a front top perspective view of the CNG pressure regulator of the present disclosure;

FIG. 5B is a rear bottom perspective view of the CNG pressure regulator of the present disclosure;

DETAILED DESCRIPTION OF THE PREFERRED EMBODIMENTS

Figure 1:
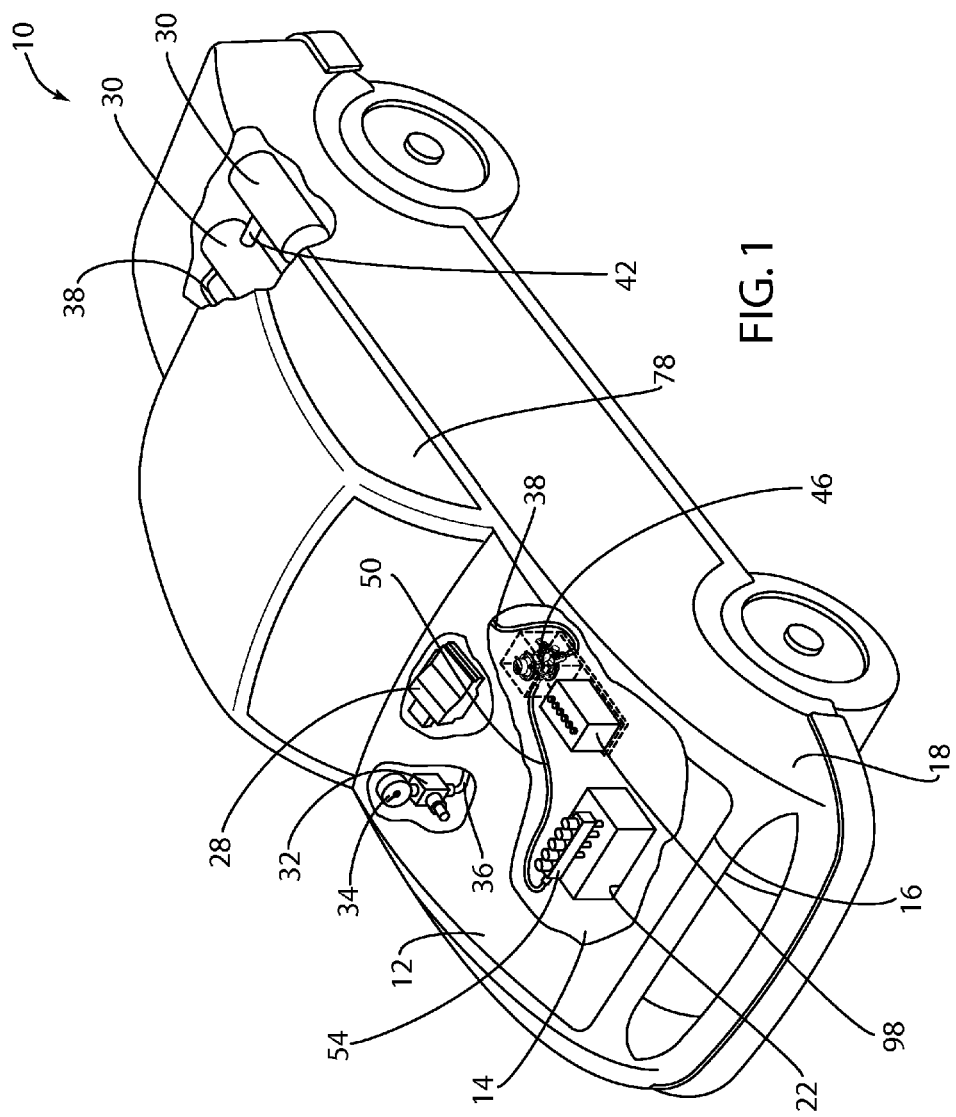
FIG. 1 is a perspective view of a motor vehicle incorporating the protective bracket for a CNG pressure regulator of a CNG fuel delivery system in accordance with the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Motor vehicle 10 includes a hood 12 covering an engine compartment 14. Hood 12 may be connected to the body of the vehicle 10 by hinges (not shown) as is typical. In the closed position shown in FIG. 1, hood 12 is disposed adjacent and extends across an opening 16 in the body of vehicle 10, providing access to an engine compartment 14. Hood 12 is releasably connected to the vehicle body 10 by a latch assembly (not shown) and is pivotable relative to the vehicle body to move between an open position and a closed position.

Motor vehicle 10 may be provided with a deformable forward section 18 extending generally forward of and including the hood 12 and engine compartment 14. It is contemplated that the forward section 26 will deform. It is also contemplated that the hood 12 may be designed to allow for deformation.

Figure 2:
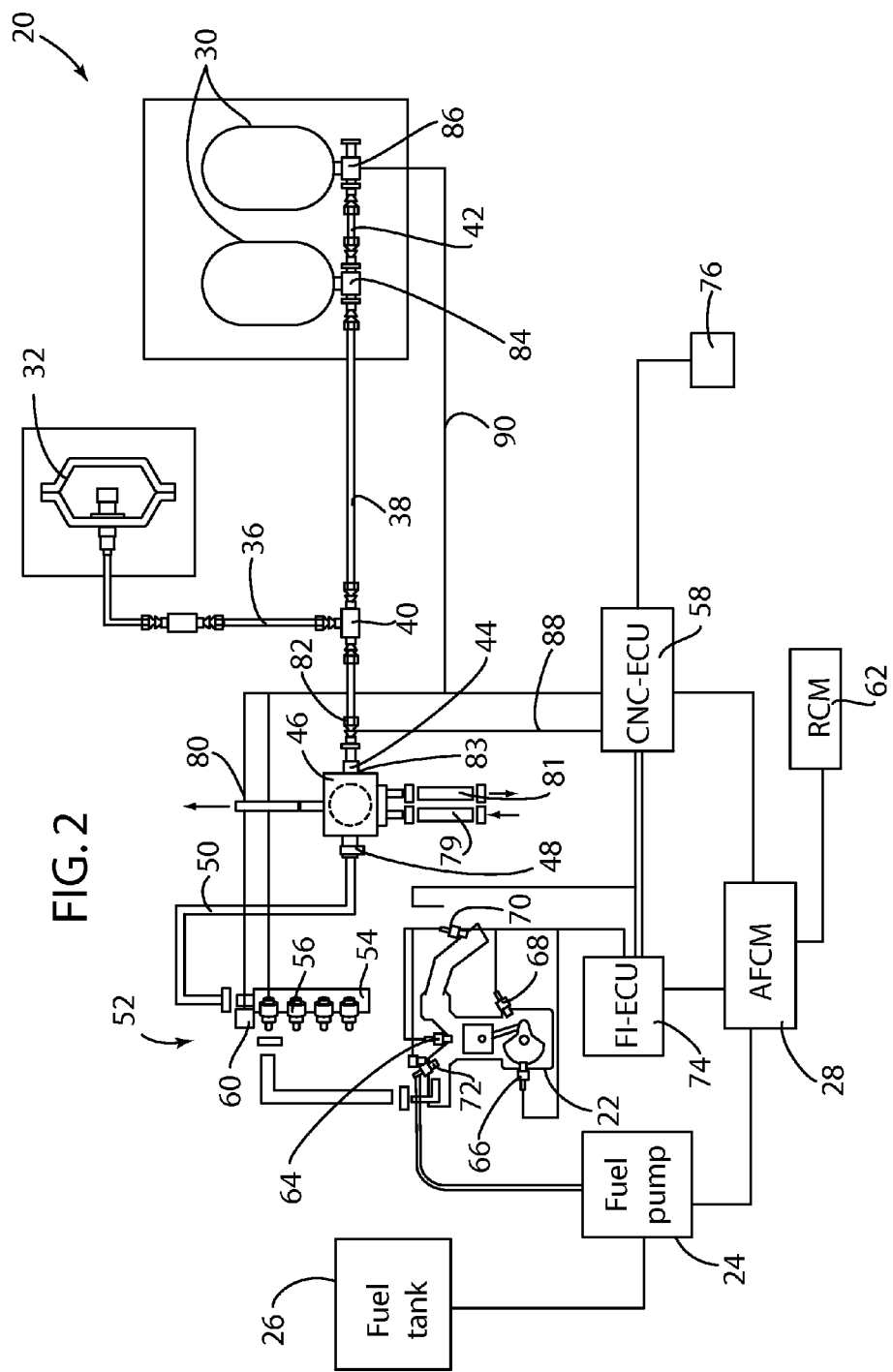
FIG. 2 is a schematic view of the CNG fuel delivery system in accordance with the present disclosure.
Figure 3:
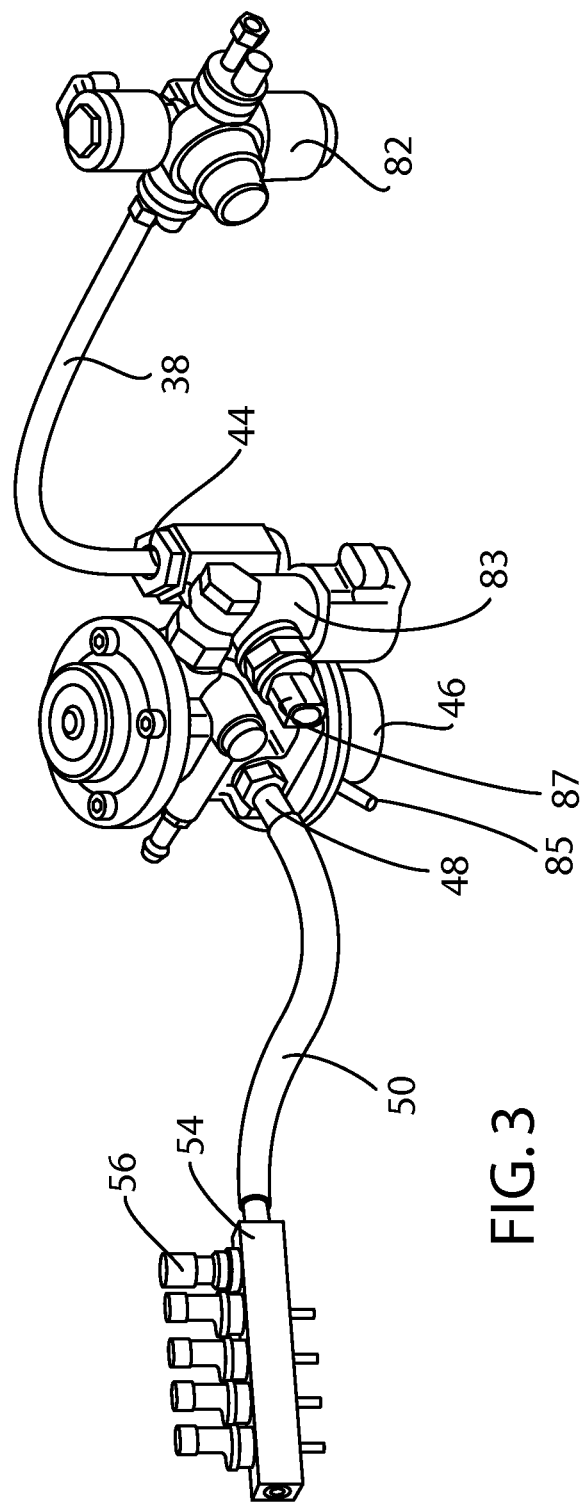
FIG. 3 is a perspective bottom view of the CNG pressure regulator of the CNG fuel delivery system of the present disclosure.
Figure 6A:
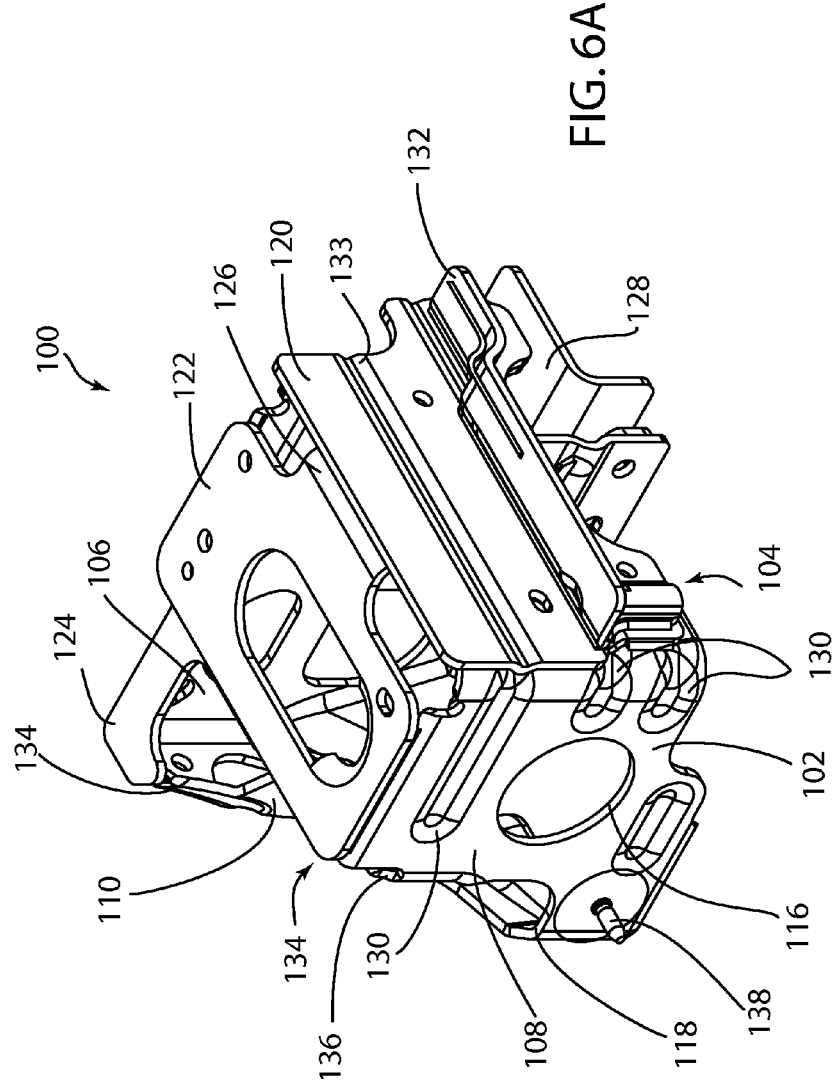
FIG. 6A is a front top perspective view of the protective bracket for the CNG pressure regulator of the present disclosure.
Figure 6B:
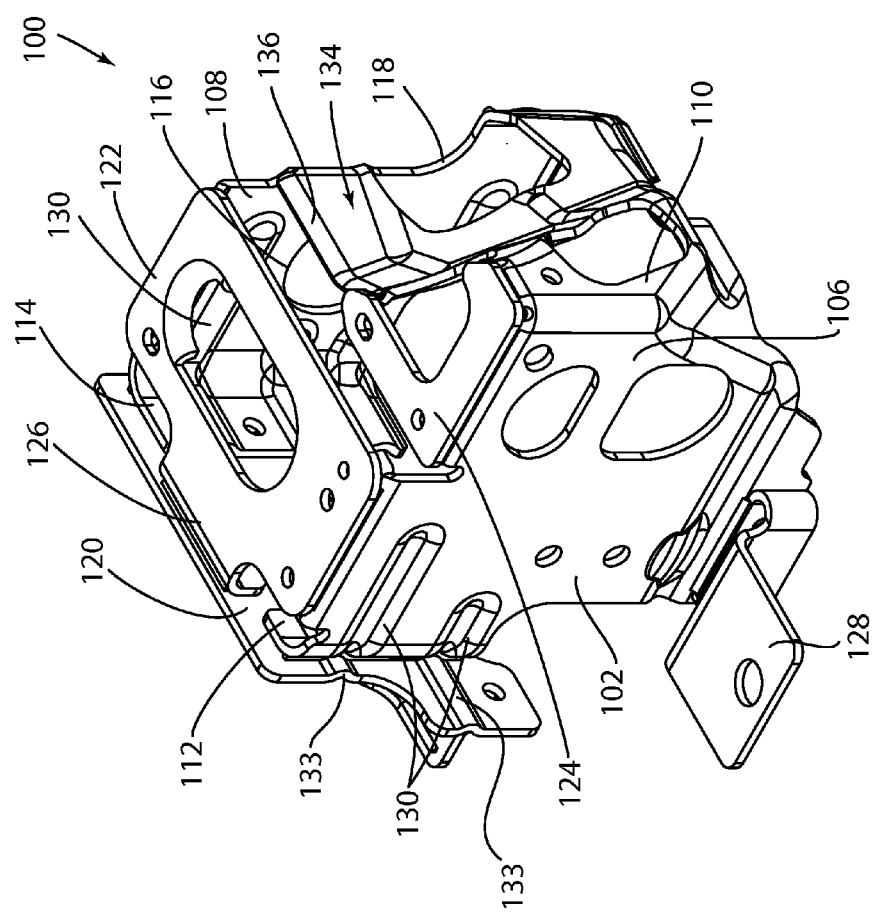
FIG. 6B is a rear top perspective view of the protective bracket for the CNG pressure regulator of the present disclosure.

Referring now to FIGS. 1, 2, and 3 a CNG fuel delivery system 20 is in selective fluid communication with an internal combustion engine 22 mounted in the engine compartment 14 of the motor vehicle 10. While the present disclosure is directed primarily to the CNG fuel delivery system 20, it should be appreciated that the motor vehicle 10 may also be adapted to operate on either of gasoline or compressed natural gas as a so-called dual fuel motor vehicle. In such a case, the motor vehicle 10 further comprises a gasoline fuel pump 24 that delivers gasoline to the internal combustion engine 22 from a gasoline fuel tank 26. In such applications, the motor vehicle 10 is preferably provided with an alternative fuel control module (AFCM) 28 that automatically switches back to gasoline in case the pressure measured for the CNG delivered to the internal combustion engine 22 falls before a predetermined level, such as 1 Bar.

The CNG fuel delivery system 20 preferably includes a pair of CNG pressurized tanks 30 for storing CNG aboard the motor vehicle 10. CNG receptor 32, preferably provided with an internal check valve (not shown), is provided under the hood 12 in the engine compartment 14 and may be used to refuel the CNG pressurized tank 30 from an external source. CNG receptor 32 is preferably provided with a pressure gage 34 to assist in the refueling process. CNG fueled through the CNG receptor 32 is delivered to the CNG pressurized tanks 30 via refueling lines 36 that flow to fuel delivery lines 38 via three way joint 40.

High pressure fuel delivery lines 38 extend from the CNG pressure tanks 30, which are in fluid connection one to the other via coupling line 42, and to an inlet 44 of CNG pressure regulator 46. CNG pressure regulator 46 reduces the pressure in two stages, from 3000 psi to 80 psi, and then from 80 psi to 30 psi. CNG then flows at the lower pressure from a CNG pressure regulator outlet 48 through low pressure lines 50 to an intake system 52 that includes intake manifold 54 provided with a plurality of fuel injectors 56. Preferably, a CNG electronic controller 58 and a pressure/temperature sensor 60 is provided to measure the pressure delivered to the fuel injectors 56, as noted above.

As part of the engine controls, the internal combustion engine 22 includes spark plugs 64, RPM sensor 66, thermocouple 68, and oxygen sensor 70, all of which operate in the typical fashion to monitor and control engine performance. In the case where the internal combustion engine 22 is also adapted to operate on gasoline, the fuel pump 24 may deliver gasoline to a gasoline injector 72 on the intake manifold 54. Further, in this case, a gasoline electronic controller 74 is provided, as is a fuel change-over switch 76 located in the passenger compartment 78. A restraint control module 62 is also provided which is integrated with the passive restraint systems of the motor vehicle 10 and is disposed to provide a crash event signal in the event of an impact.

The CNG pressure regulator 46 is thus functionally disposed between the CNG pressurized tanks 30 and the intake system 32 for the internal combustion engine 22 within the engine compartment 14. Preferably, the CNG pressure regulator 46 operates via engine vacuum provided from the intake manifold 54 via vacuum line 80 to vacuum fitting 85. The CNG pressure regulator is also provided with coolant inlet 79 and coolant outlet 81, as noted above, in order to heat the natural gas as it is expanded within the CNG pressure regulator 46 to increase the enthalpy of the fuel entering the internal combustion engine 22. Further, the high pressure line 38 to the CNG pressure regulator 46 is provided with a normally closed solenoid valve 82 and the tanks 30 are provided with normally closed solenoid valves 84, 86. Preferably, the gas pressure regulator 46 is also provided with a normally closed solenoid valve 83 at the inlet 44. Solenoid valves 82 and 83 are electronically connected to the CNG electronic controller 58 via wiring harness 88, with solenoid valve 83 connected at the CNG pressure regulator 46 by connector 87. Solenoid valves 84, 86 are electronically connected to the CNG electronic controller 58 via wiring harness 90.

During a crash event with the motor vehicle 10 operating in CNG mode, the restraint control module 62 sends an event notification signal to the alternative fuel control module 28, which then communicates with the CNG electronic controller 58, which cuts the power for normally closed solenoid valves 82, 83, 84, and 86 proximate the gas pressure regulator 46 and the tanks 30 to avoid leakage of CNG. With the motor vehicle 10 operating in the gasoline mode, the alternative fuel control module 28 communicates with the gasoline electronic controller 74 in response to a crash event signal to deactivate the fuel pump 24.

As shown in FIGS. 1 and 4, a preferred location for the CNG pressure regulator 46 presenting the best balance of the aforementioned factors is in the engine compartment 14, next to the driver's side rail or apron 92, in front of the braking system pressure booster 94, and behind the battery tray 96 supporting battery 98. As an aspect of the present disclosure, this location has been found to provide the greatest relative ease of assembly and serviceability for a mass production vehicle. However, this location, as with all locations, must comply with FMVSS 303, which, as noted above, specifies requirements for the integrity of motor vehicle fuel systems using CNG, which requires that the system must be able to withstand a 30 mph frontal impact and the pressure drop in the high pressure portion of the fuel system, from vehicle impact through the 60 minute period following cessation of motion, shall not exceed 154 psi.

Figure 7:
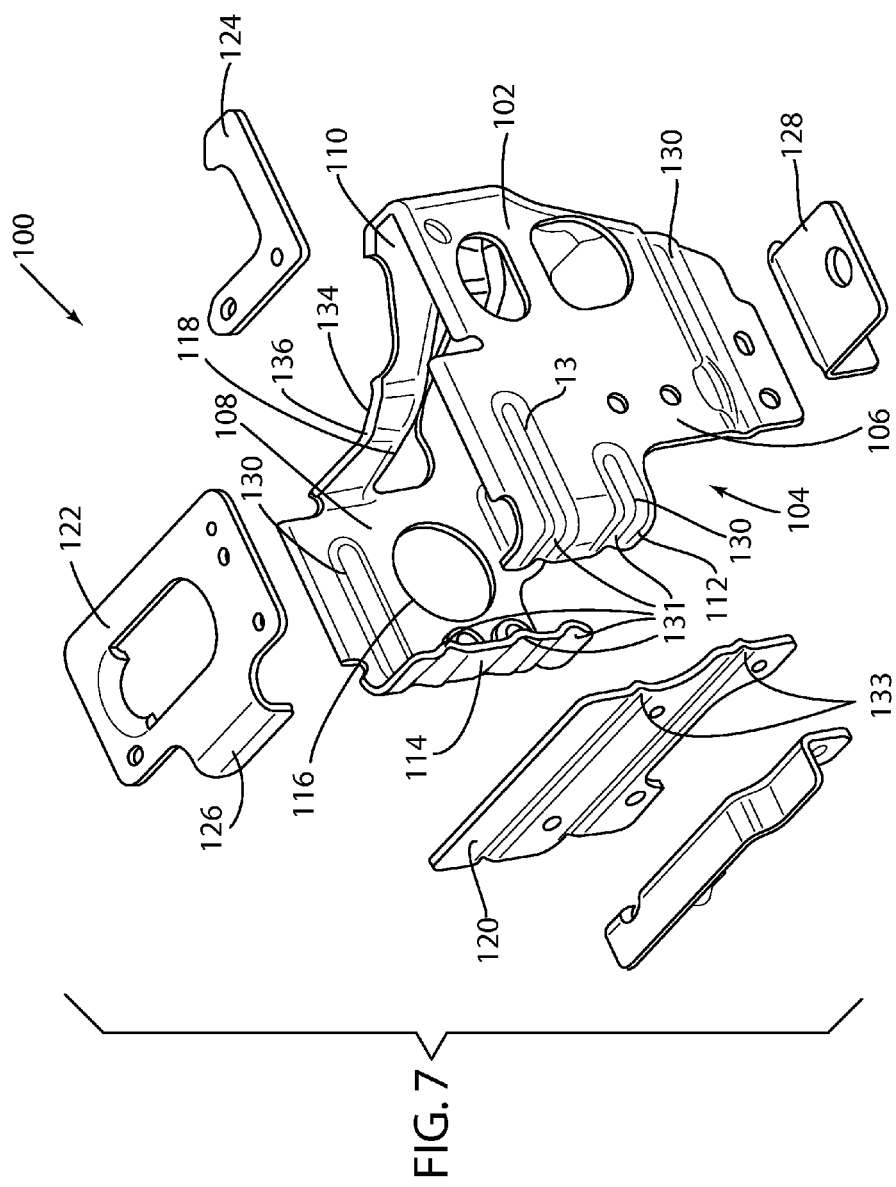
FIG. 7 is an exploded front top perspective view of the protective bracket for the CNG pressure regulator of the present disclosure.
Figure 8A:
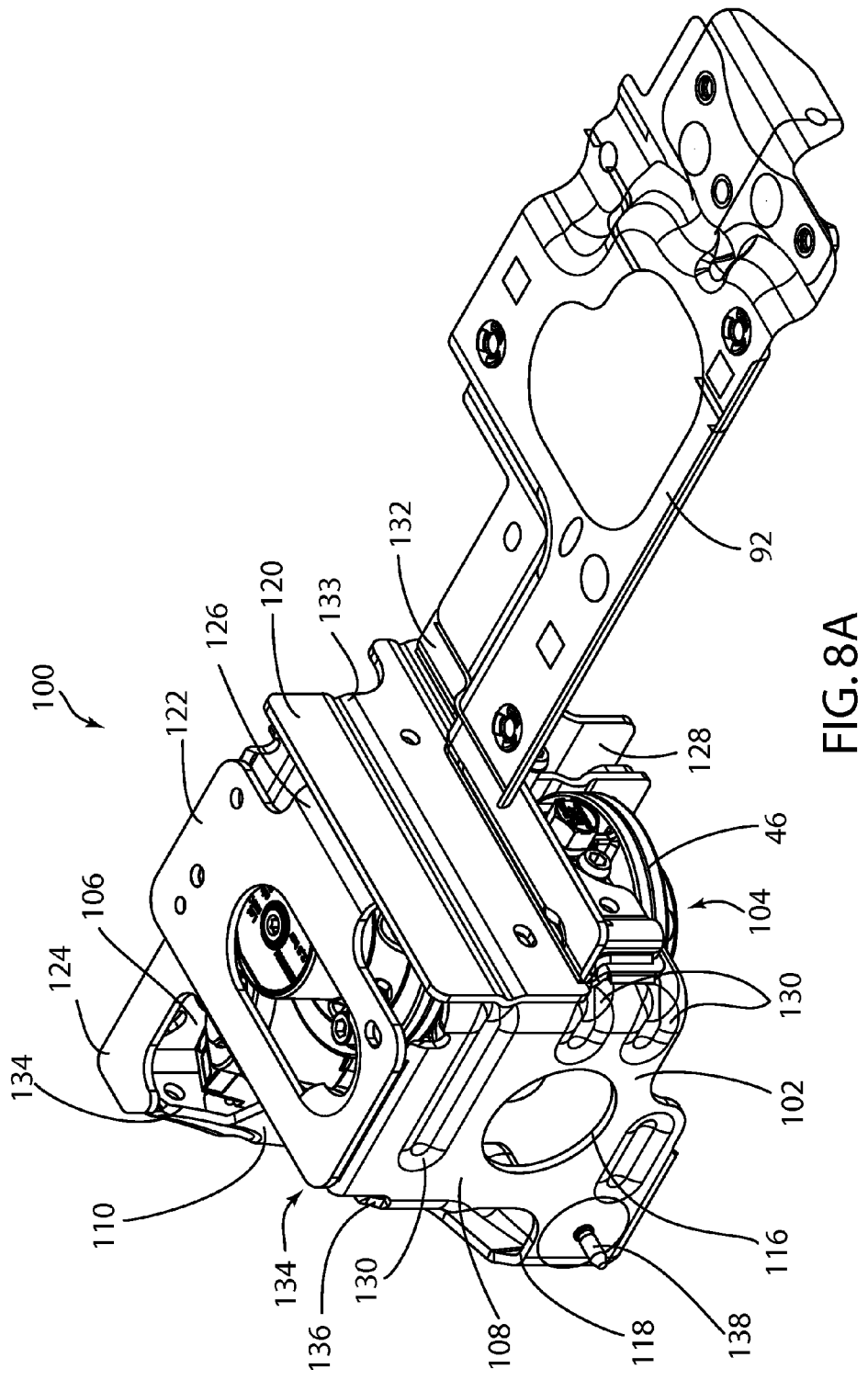
FIG. 8A is a front top perspective view of the protective bracket for the CNG pressure regulator of the present disclosure with the CNG regulator installed.
Figure 8B:
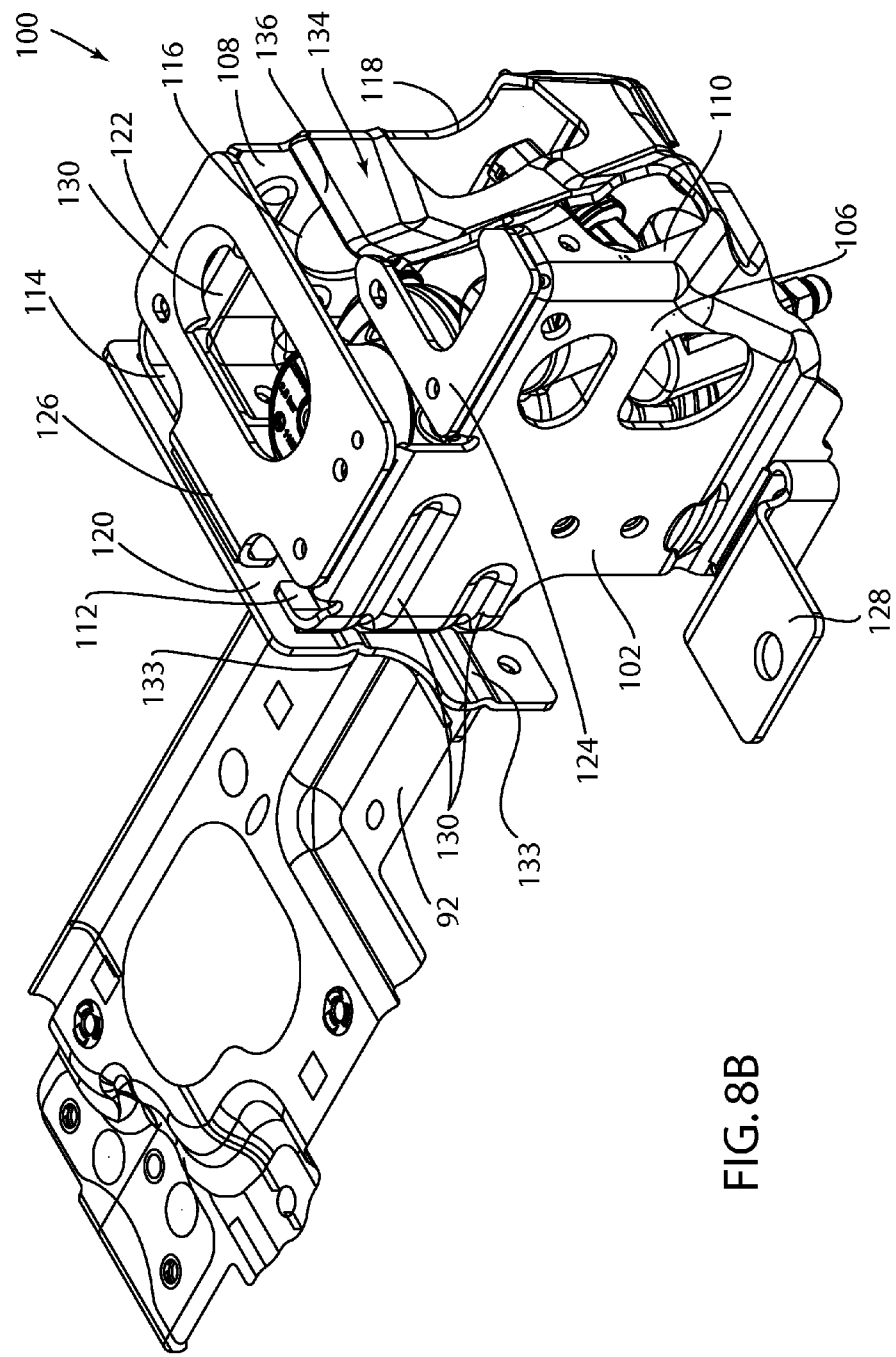
FIG. 8B is rear side perspective view of the protective bracket for the CNG pressure regulator of the present disclosure with the CNG regulator installed.

The CNG pressure regulator 46 is thus situated within a pressure regulator protective bracket 100, preferably having an internal volume exceeding approximately 3100 cubic centimeters, which exceeds the external volume of the CNG pressure regulator 46, as best shown in FIGS. 5A-8B. The pressure regulator protective bracket 100 is preferably composed of six stamped components welded together, as best seen in FIG. 7, each fabricated of 3 mm thick, high strength, low alloy steel 350. The first component is main body 102 that is formed into an enclosure 104 having a pair of side walls 106, 108, a rear wall 110, and pair of cooperating front walls 112, 114. The main body 102 includes a number of openings, including opening 116 through which the low pressure gas line 50 passes and opening 118 through which wiring harness 88 passes. The regulator inlet 44 is in selective communication with the high pressure line 38 that passes through the open bottom of the pressure regulator bracket 100.

The CNG pressure regulator 46 is preferably attached to the main body 102 via fasteners (not shown) that extend through fastener openings 140 in the side wall 106 of the main body 102 and into threaded holes 142 formed in a boss 144 of the CNG pressure regulator 46.

A front bracket 120 extends between and is welded to each of the pair of front walls 112, 114. A top front reinforcing bracket 122 and a top rear reinforcement bracket 124 are likewise welded to the side walls 106, 108. Preferably, a tab 126 on the top front reinforcing bracket 122 is welded to the front bracket 120. A bracket clamp member 128 is welded to the side wall 106 and is used to attach the pressure regulator protective bracket 100 to the side rail 92 via a threaded fastener (not shown). A stud weld 138 is provided on the exterior of the oppose side wall 108 to assist in locating the pressure protective bracket 100 during the assembly process.

Preferably, the pair of side walls 106, 108 are oriented parallel to the longitudinal axis of the motor vehicle, and the front walls 112, 114 are oriented perpendicular to the longitudinal axis of the motor vehicle. Each of the side walls 106, 108 are preferably provided with a first set of stiffener ribs 130 oriented parallel to the longitudinal axis of the motor vehicle. The front walls 112, 114 preferably have a second set of stiffener ribs 131 oriented perpendicular to the longitudinal axis of the motor vehicle. Similarly, the front bracket 120 is preferably provided with ribs 133 extending across the front bracket 120. The ribs 130, 131, 133 resist deformation of the main body 102 and minimize the compression forces exerted on the gas pressure regulator 46.

To further reduce the load experienced by the CNG pressure regulator 46, the pressure regulator protective bracket 100 is preferably welded to the battery tray 96 via tray coupling bracket 132, which is welded to each of the battery tray 96 and the front wall 120. Advantageously, the pressure regulator protective bracket 100 can be welded to the battery tray 92 without having to change the pre-existing configuration of the battery tray 92, which in fact can preferably be the same as that used on the gasoline fueled vehicle.

Additionally, to prevent displacement of the pressure regulator protective bracket 100, the attachment location to the side rail or apron 92 is preferably designed to unfold and to follow the movement towards the brake booster 94, which is received in a cut-out 134 formed in the upper passenger side corner 136 of the rear wall 110 of the main body 102. By adding this feature to the pressure regulator protective bracket 100, excessive rotation of the CNG pressure regulator 46 is avoided, as are the attendant potential leakage modes. This feature also reduced the stress on the stainless steel high pressure line 38 that is connected to the CNG pressure regulator 46 at inlet 44

As noted above, the main body 102 of the CNG regulator protective bracket 100 encircles the CNG pressure regulator 46. The entire external volume of the CNG regulator 46 is thus disposed essentially within the main body 102. Therefore, as noted above, compliance with FMVSS 303 can be obtained. At the same time, the pressure regulator protective bracket 100 has been optimized to fit into the engine compartment 14. The pressure regulator protective bracket 100 is lightweight and can be welded to the battery tray 92 without any additional modification of the battery tray 92. The pressure regulator protective bracket 100 also reduces the stress to the high pressure stainless steel line 38 connected to the CNG pressure regulator 46, which are reduced by absorbing displacement with the pressure regulator protective bracket 100 components.

The pressure regulator protective bracket 100 is also an attachment point for the CNG pressure regulator 46, which contributes to the ease of assembly, serviceability, and ergonomics, particularly for a dual fuel mass production vehicle. For example, in assembly, the CNG pressure regulator 46 may be inserted into and fixedly attached to the main body 102, such that the entire external volume of the natural CNG pressure regulator 46 is disposed within the main body 102. The CNG regulator protective bracket 100 is then attached to the side rail or apron 92 within the engine compartment 14. The high pressure delivery line 38 can then be connected to the regulator inlet 44, and the low pressure delivery line 50 can be connected to the regulator outlet 48 through the opening 116. Finally, the wiring harness can be connected to the connector on the CNG pressure regulator 46 through the opening 118. Accordingly, the CNG regulator protective bracket 100 can be used on a motor vehicle 10 to readily adapt the motor vehicle 10 to run on CNG only or alternatively on a dual fuel system including CNG and gasoline.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A protective bracket for a compressed natural gas pressure regulator of a compressed natural gas fuel delivery system in fluid communication with an internal combustion engine mounted in an engine compartment of a motor vehicle, the compressed natural gas fuel delivery system comprising at least one natural gas pressurized tank for storing natural gas aboard the motor vehicle and fuel delivery lines extending from the pressured tank to an intake system for the internal combustion engine, wherein the compressed natural gas pressure regulator is disposed between the natural gas pressurized tank and the intake system for the internal combustion engine within the engine compartment, and wherein the protective bracket comprises a main body disposed essentially about the entire external volume of the natural gas pressure regulator, the main body comprising a first set of stiffener ribs oriented parallel to a longitudinal axis of the motor vehicle and a second set of stiffener ribs oriented perpendicular to the longitudinal axis of the motor vehicle to resist deformation of the main body and reduce compression forces exerted on the as pressure regulator in the event of a frontal impact.

2. The protective bracket of claim 1, wherein the motor vehicle further comprises a crash event sensor, a controller responsive to the crash event sensor and fuel delivery lines extending from the natural gas pressured tank to an intake system for the internal combustion engine, and an electronically actuated normally closed valve being disposed between the natural gas pressurized tank and the gas pressure regulator, and wherein the controller signals the electronically actuated, normally closed valve to terminate the flow of compressed natural gas in the response to a crash event detected by the crash sensor.

3. The protective bracket of claim 1, wherein the gas pressure regulator further comprises a high pressure compressed natural gas inlet from which high pressure natural gas is delivered to the gas pressure regulator through a high pressure delivery line and a low pressure compressed natural gas outlet from which low pressure natural gas is delivered to the internal combustion engine from the gas pressure regulator through a low pressure delivery line and the main body is provided with an opening aligned with the low pressure compressed natural gas outlet through which the low pressure delivery line passes.

4. The protective bracket of claim 3, wherein the high pressure compressed natural gas inlet and the low pressure compressed natural gas outlet are disposed within the main body of the protective bracket.

5. The protective bracket of claim 1, wherein the protective bracket further comprises a front bracket and a top reinforcing bracket mounted to the main body to resist deformation of the main body and reduce compression forces exerted on the gas pressure regulator in the event of a frontal impact.

6. A protective bracket for a compressed natural gas pressure regulator of a compressed natural gas fuel delivery s fluid communication with an internal combustion engine mounted in an engine compartment of a motor vehicle, the compressed natural gas fuel delivery system comprising at least one natural gas pressurized tank for storing natural gas aboard the motor vehicle and fuel delivery lines extending from the pressured tank to an intake system for the internal combustion engine, wherein the compressed natural gas pressure regulator is disposed between the natural gas pressurized tank and the intake system for the internal combustion engine within the engine compartment, and wherein the protective bracket comprises a main body disposed essentially about the entire external volume of the natural gas pressure regulator, and the protective bracket further comprises a front bracket and a top reinforcing bracket mounted to the main body to resist deformation of the main body and reduce compression forces exerted on the gas pressure regulator in the event of a frontal impact, and a battery tray disposed within the engine compartment in front of the gas pressure regulator, wherein the protective bracket further comprises a tray coupling bracket mounted to the front bracket and to the battery tray.

7. The protective bracket of claim 1, wherein the main body of the protective bracket further comprises a first pair of side walls oriented parallel to a longitudinal axis of the motor vehicle and second pair of side walls oriented perpendicular to the longitudinal axis of the motor vehicle, the first pair of side walls having a first set of stiffener ribs oriented parallel to the longitudinal axis of the motor vehicle and the second pair of side walls having a second set of stiffener ribs oriented perpendicular to the longitudinal axis of the motor vehicle to resist deformation of the main body and reduce compression forces exerted on the gas pressure regulator in the event of a frontal impact.

8. The protective bracket of claim 1, wherein the protective bracket further comprises a first pair of side walls oriented parallel to a longitudinal axis of the motor vehicle, a front bracket and a top reinforcing bracket, the front and top reinforcing bracket extending between and mounted to each of the first pair of side walls.

9. The protective bracket of claim 8, wherein the top reinforcing bracket further comprises a front top reinforcing bracket and rear top reinforcing bracket extending between and mounted to each of the first pair of side walls.

10. The protective bracket of claim 1, wherein the protective bracket further comprises a clamp member attached to a side rail provided within the engine compartment.

11. The protective bracket of claim 1, wherein the motor vehicle includes a controller and the gas pressure regulator further comprises a connector for receiving a wiring harness connected with the motor vehicle controller, the main body further comprising an opening aligned with the connector through which the wiring harness passes, and wherein the connector is disposed entirely within the main body of the protective bracket.

12. The protective bracket of claim 1, wherein the protective bracket further comprises a first pair of side walls oriented parallel to a longitudinal axis of the motor vehicle, a front bracket and a top reinforcing bracket, the front and top reinforcing brackets extending between and mounted to each of the first pair of side walls.

13. The protective bracket of claim 12, wherein the top reinforcing bracket further comprises a front top reinforcing bracket and rear top reinforcing bracket extending between and mounted to each of the first pair of side walls and the main body comprises a recess within which a brake booster body is received.

14. The protective bracket of claim 1, wherein the protective bracket is fabricated from stamped high strength low alloy steel.

15. The protective bracket of claim 1, wherein the motor vehicle is adapted to operate on either of gasoline or compressed natural gas and the motor vehicle further comprises a gasoline fuel pump, a crash event sensor, a controller responsive to the crash event sensor, a natural gas pressurized tank for storing natural gas aboard the motor vehicle and fuel delivery lines extending from the pressured tank to an intake system for the internal combustion engine, the compressed natural gas pressure regulator being disposed between the natural gas pressurized tank and the intake system for the internal combustion engine within the engine compartment, and an electronically actuated valve being disposed between the natural gas pressurized tank and the gas pressure regulator, and wherein the controller signals the fuel pump and the electronically actuated valve to terminate the flow of gasoline and compressed natural gas in the response to a crash event detected by the crash sensor.

16. A method of protecting a compressed natural gas pressure regulator of a compressed natural gas fuel delivery system in fluid communication with an internal combustion engine mounted in an engine compartment of a motor vehicle, the compressed natural gas fuel delivery system comprising at least one natural gas pressurized tank for storing natural gas aboard the motor vehicle and fuel delivery lines extending from the pressured tank to an intake system for the internal combustion engine, wherein the compressed natural gas pressure regulator is disposed between the natural gas pressurized tank and the intake system for the internal combustion engine within the engine compartment, and wherein the motor vehicle further comprises a crash event sensor, a controller responsive to the crash event sensor and fuel delivery lines extending from the natural gas pressured tank to an intake system for the internal combustion engine, and an electronically actuated valve being disposed between the natural gas pressurized tank and the gas pressure regulator, and wherein the controller signals the electronically actuated valve to terminate the flow of compressed natural gas in response to a crash event detected by the crash sensor, the gas pressure regulator further comprising a connector for receiving a wiring harness connected with the controller and an opening in the main body aligned with the connector through which the wiring harness passes and wherein the connector is disposed entirely within the main body of the protective bracket, wherein the method comprises the steps of:

providing the compressed natural gas pressure regulator with a compressed natural gas inlet from which high pressure natural gas is delivered to the gas pressure regulator through a high pressure delivery line and a low pressure compressed natural gas outlet from which low pressure natural gas is delivered to the internal combustion engine from the gas pressure regulator through a low pressure delivery line;

providing a protective bracket having a main body provided with an opening aligned with the compressed natural gas inlet when the natural gas pressure regulator is disposed within the protective bracket;

inserting the natural gas pressure regulator into and attaching the natural gas pressure regulator to the main body such that the entire external volume of the natural gas pressure regulator is fixedly disposed within the main body;

mounting the protective bracket to a side rail within the engine compartment;

connecting the wiring harness to the connector; and connecting the regulator inlet from which high pressure natural gas is delivered to the high pressure delivery line and connecting the regulator outlet to the low pressure delivery line.

\* \* \* \* \*